No. 795,479. PATENTED JULY 25, 1905.
H. H. BUFFUM.
SPEED CHANGING AND REVERSING GEAR.
APPLICATION FILED APR. 1, 1904.

5 SHEETS—SHEET 1.

WITNESSES:
H. L. Robbins
A. C. Ratigan

INVENTOR:
H. H. Buffum,
By Wright, Brown & Quinby
Attys.

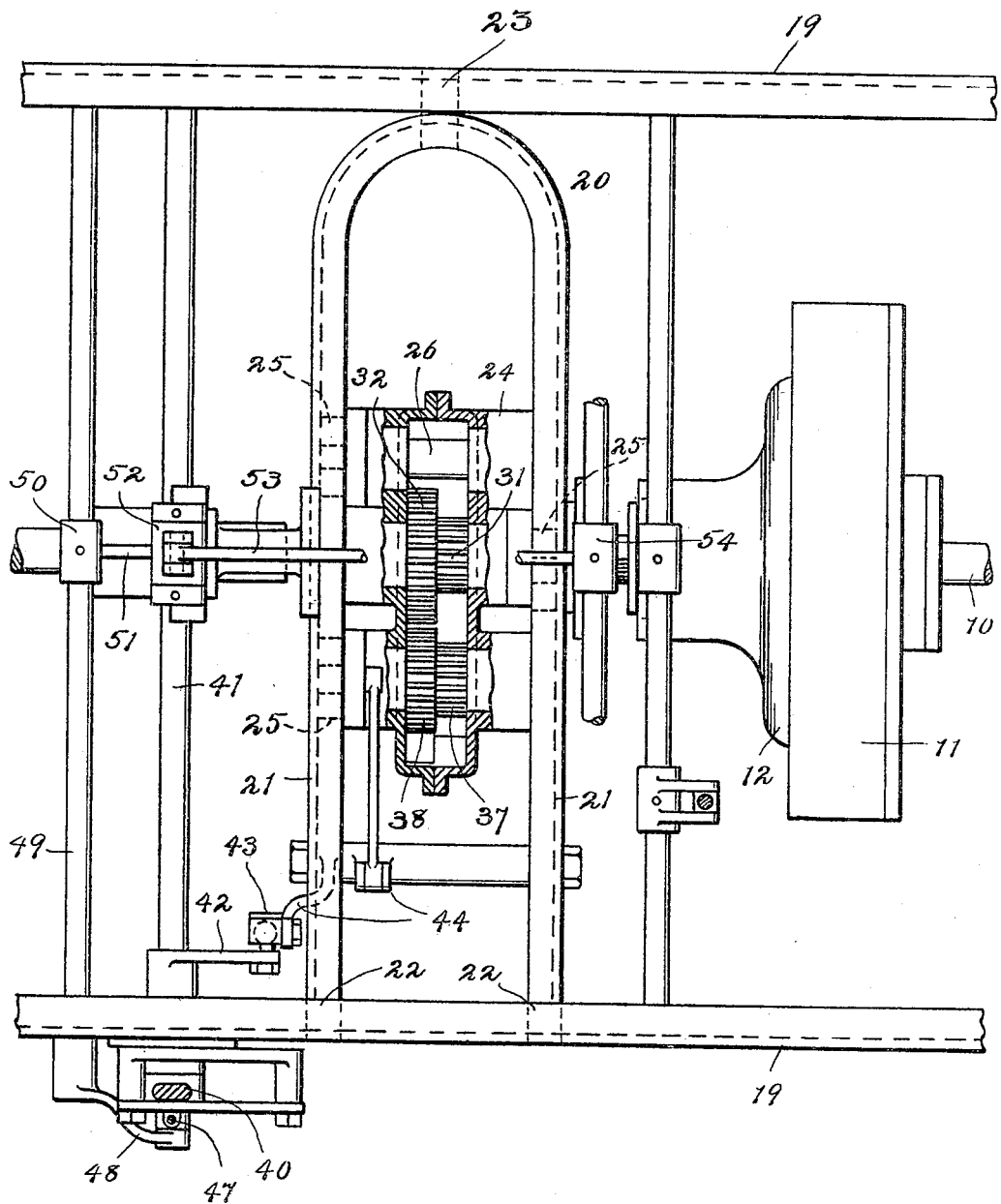

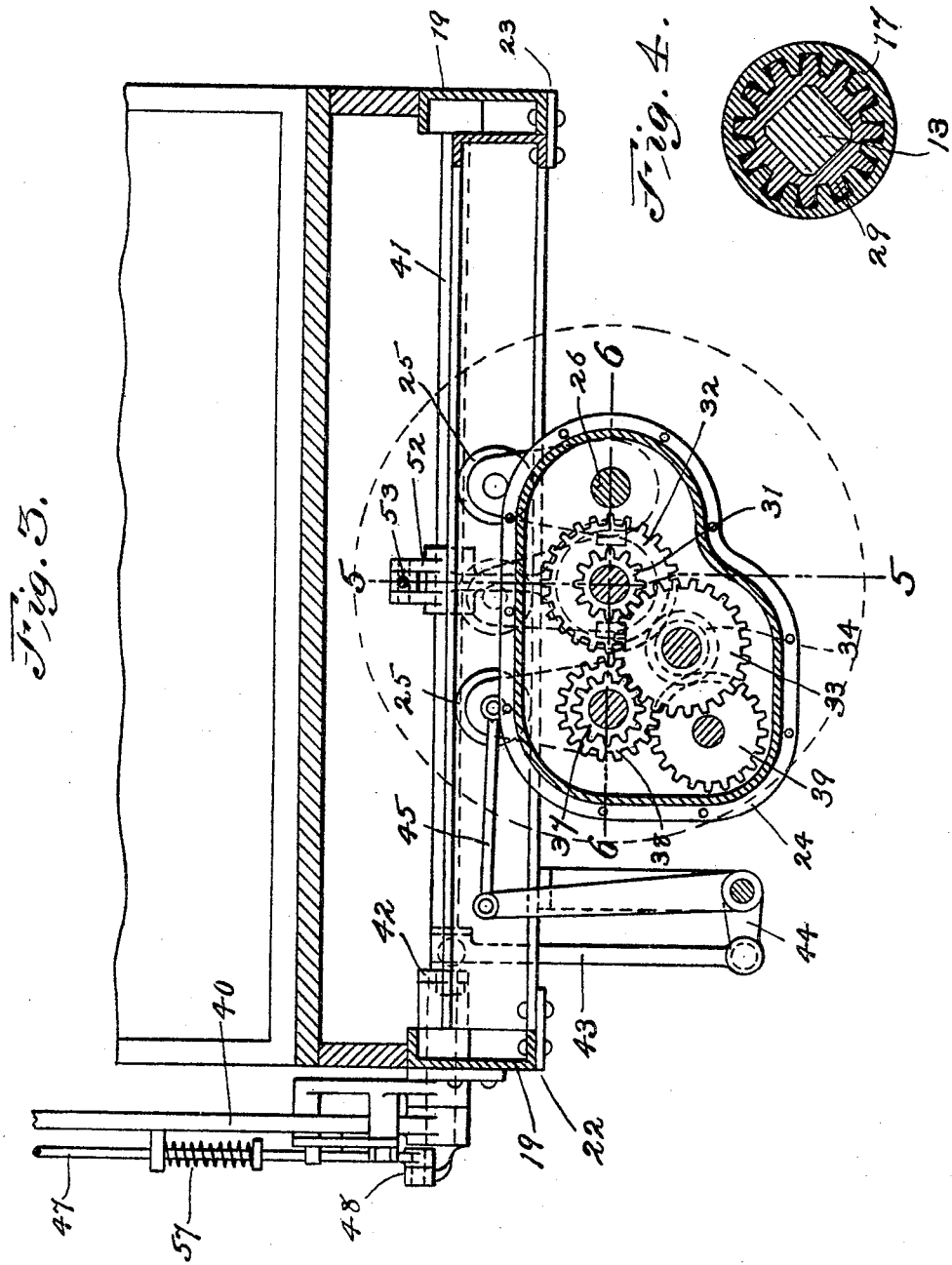

No. 795,479. PATENTED JULY 25, 1905.
H. H. BUFFUM.
SPEED CHANGING AND REVERSING GEAR.
APPLICATION FILED APR. 1, 1904.

5 SHEETS—SHEET 4.

WITNESSES:
H. L. Robbins
A. C. Ratigan

INVENTOR:
H. H. Buffum,
By Wright, Brown & Quinby
Attys.

No. 795,479. PATENTED JULY 25, 1905.
H. H. BUFFUM.
SPEED CHANGING AND REVERSING GEAR.
APPLICATION FILED APR. 1, 1904.

5 SHEETS—SHEET 5.

WITNESSES:
H. L. Robbins.
A. C. Raleigh

INVENTOR:
H. H. Buffum,
By Wright, Brown & Quinby
Attys.

UNITED STATES PATENT OFFICE.

HERBERT H. BUFFUM, OF ABINGTON, MASSACHUSETTS, ASSIGNOR TO H. H. BUFFUM COMPANY, OF ABINGTON, MASSACHUSETTS, A CORPORATION OF MAINE.

SPEED CHANGING AND REVERSING GEAR.

No. 795,479.     Specification of Letters Patent.     Patented July 25, 1905.

Application filed April 1, 1904. Serial No. 201,144.

*To all whom it may concern:*

Be it known that I, HERBERT H. BUFFUM, of Abington, in the county of Plymouth and State of Massachusetts, have invented certain new and useful Improvements in Speed Changing and Reversing Gears, of which the following is a specification.

This invention relates to mechanism for transmitting motion from a driving-shaft to a driven shaft at different relative speeds and in reverse directions, the mechanism, as hereinafter shown, being particularly designed for automobiles, though adapted to other uses.

Figure 1:
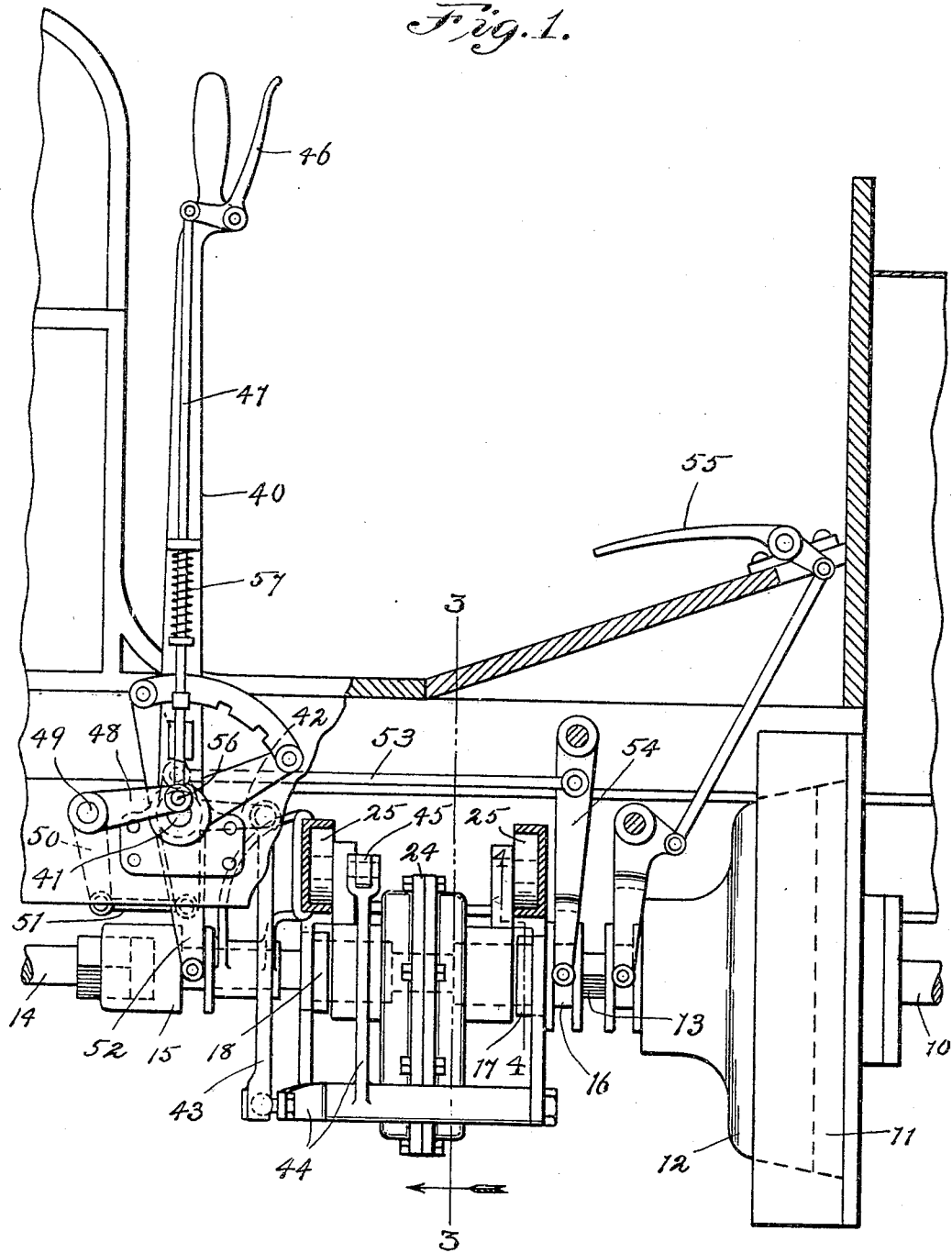
Figure 5:
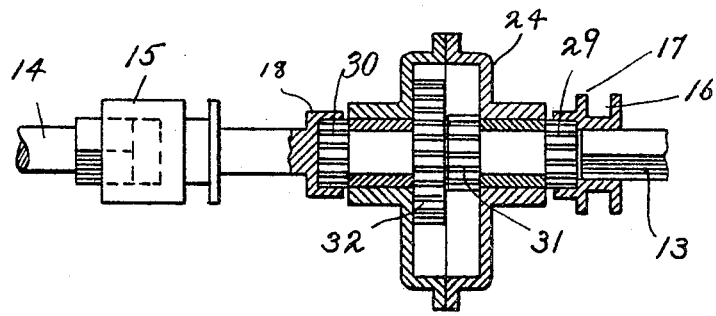
Figure 6:
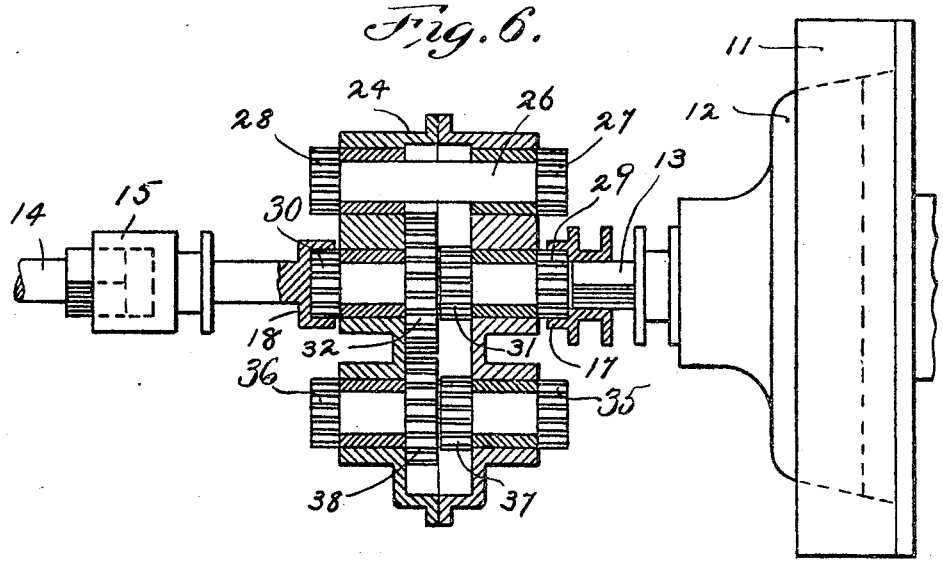
Figure 7:
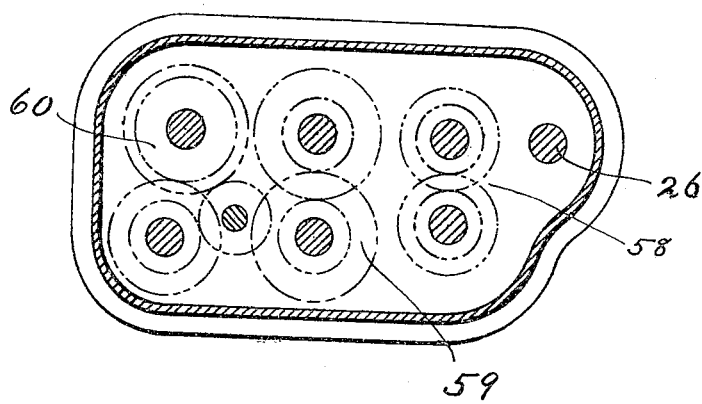
Figure 8:
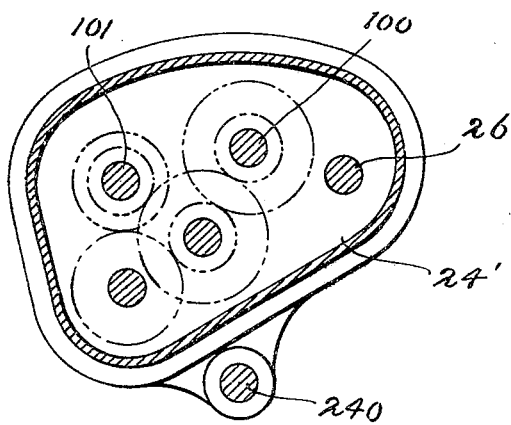

Of the accompanying drawings, Figure 1 represents a longitudinal vertical section of a speed changing and reversing gear embodying my invention. Fig. 2 represents a plan view thereof, partly in section. Fig. 3 represents a section on line 3 3 of Fig. 1. Fig. 4 represents a section on line 4 4 of Fig. 1. Fig. 5 represents a section on line 5 5 of Fig. 3. Fig. 6 represents a section on line 6 6 of Fig. 3. Figs. 7 and 8 represent transverse diagrammatic sections showing two modifications.

The same reference characters indicate the same parts in all the figures.

In the drawings, 10 is the drive-shaft from the motor, having clutch member 11, engaging complemental clutch member 12, slidable longitudinally on a drive-shaft section 13.

14 is the driven shaft, adapted to transmit motion to the driving-wheels of the vehicle or other driven part and having a slidable section 15. The drive-shaft has a slidable section 16, formed with a clutch member 17, having the shape of an internal gear. The driving and driven shafts are in line with each other. The driven shaft has a clutch member 18 in the form of an internal gear.

19 19 are the side bars of the vehicle-frame, supporting a transverse guide member 20, composed of parallel guides 21 21. This guide member has a three-point support in the frame 19 19, one end being supported at the two separate points 22 and the other at the single point 23. This compensates for twisting strains of the vehicle-frame and avoids cramping.

Between the guides 21 is mounted a sliding frame or gear-box 24, which has a three-point suspension in the guides by means of three rollers 25 25, two of these engaging one guide and the third engaging the other guide. This frame 24 carries a series of connecting units whose axes are parallel with the driving and driven shafts 10 14, these units serving to connect the driving and driven shafts in different speed relations and also for reverse driving. One of these units is a solid shaft-section 26, mounted in suitable bearings in the frame 24, preferably of an antifriction nature, such as roller-bearings or ball-bearings, and having at its opposite ends clutch members 27 28, shaped like ordinary spur-gears and adapted to engage, respectively, the clutch member 17 on the driving-shaft and the clutch member 18 on the driven shaft. The next connecting unit is composed of two alined short shaft-sections having clutch members 29 30, similar to the clutch members 27 28, for engaging the clutch members 17 18, and a speed-reducing gearing composed of the gears 31 32, connected to the respective clutch members 29 30 and meshing, respectively, with gears 33 34 on a short counter-shaft journaled in the gear-box 24. The reversing unit is composed of alined shaft-sections having clutch members 35 36, similar to 27 28, &c., for engaging the members 17 18, the gears 37 38, attached to the respective clutch members 35 36, the gear 33, meshing with gear 37, the gear 34, and a gear 39 on a second stud or counter-shaft meshing with the gear 34 and with the gear 38.

To shift the frame 24 laterally and bring any one of the connecting units in position to connect the driving and driven shafts, there is provided a hand-lever 40, rock-shaft 41, arm 42, link 43, bell-crank lever 44, and link 45, connecting with the frame 24.

To move the driving and driven clutch members 17 18 into and out of engagement with the clutch members of any connecting unit, the hand-lever 40 is provided with an auxiliary pivoted lever 46, connecting by link 47 with an arm 48 on a rock-shaft 49. The latter has an arm 50 thereon connected by link 51 with a forked lever 52, engaging a groove in the driven shaft-section 15, and link 53, connecting with forked lever 54, engaging a groove in the shaft-section or sleeve 16. It will be observed that the levers 52 54 throw in opposite directions, so that they simultaneously throw their clutch members either into or out of engaging position.

Such being the construction embodying my invention, its operation is as follows: Let it be assumed that the shaft 10 is continuously driven and is driving the driven shaft 14 directly or at the same speed as itself through the solid shaft-section 26. To change the gear to the second or lower speed, the clutch 11 12 is disengaged by a pedal 55 and the lever 46 grasped and drawn toward the handle of lever 40. This imparts a separating movement to the clutch members 17 18, causing them to disengage the clutch members 27 28, and at the same time brings the pivot 56 at the lower end of link 47 in line with the rock-shaft 41. The lever 40 may then be rocked without affecting the position of the clutch members 17 18. Then by throwing the lever 40 back, or to the left as viewed in Fig. 1, from its foremost position the frame 24 may be slid in its guides 21 until the clutch members 29 30 of the second-speed gear-train are in line with the driving and driven clutch members 17 18. Then upon releasing the handle 46 a compression-spring 57 throws the clutch members 17 18 into engagement with clutch members 29 30. The driving-shaft 10 then rotates the driven shaft 14 at a considerable speed reduction through the gearing 31 32 33 34. In like manner the reversing-gearing 37 38 33 34 39 may be brought into operation to connect the driving and driven shafts, as will be readily understood.

It is not essential that the reversing-train should include a part of one of the forward-driving trains, and in Fig. 7 I have shown a modification including two independent speed-reducing forward-driving trains 58 59 and a reversing-train 60 independent of the forward-driving trains.

The lateral shifting movement of the connecting units may be a rotatory one, as shown in Fig. 8, where the gear-box 24' is on a pivot 240 and the coupling-centers 26 100 101 are on an arc concentric with said pivot.

Various other modifications may be made without departing from the essentials of the invention.

I claim—

1. A power-transmitting mechanism comprising alined driving and driven shafts, connecting devices having means for connecting said shafts in different speed relations and reverse directions, and means for shifting said devices transversely of the axes of said shafts into different operative positions between the shafts and means carried by each of said shafts for coöperating with said devices.

2. A power-transmitting mechanism comprising driving and driven members having coupling devices, and a connecting unit shiftable transversely between the shafts and having coupling devices complemental to those of the driving and driven members.

3. A power-transmitting mechanism comprising alined driving and driven shafts having clutch members, and a connecting unit having clutch members transversely shiftable into and out of alinement with the driving and driven clutch members.

4. A power-transmitting mechanism comprising alined driving and driven shafts having longitudinally-shiftable clutch members, and a transversely-shiftable connecting unit having clutch members adapted to engage the clutch members of the driving and driven shafts.

5. A change-gear mechanism comprising driving and driven shafts, and transversely-shiftable connecting devices including a direct connecting unit and a gear unit and means carried by each of said shafts for coöperating with said unit.

6. A speed-changing gear comprising alined driving and driven shafts having clutch members, and a transversely-shiftable frame having connecting units each provided with clutch members adapted to engage the driving and driven clutch members, said units being arranged to connect the driving and driven shafts in different driving relations.

7. A speed-changing gear comprising alined driving and driven shafts having clutch members, a transversely-shiftable frame having a direct connecting shaft-section provided with clutch members at its ends adapted to engage the driving and driven clutch members, and a gearing unit having clutch members adapted to engage the driving and driven clutch members.

8. A speed-changing gear comprising alined driving and driven shafts, and connecting units transversely shiftable between said shafts and having provisions for connecting said shafts in forward and reverse driving directions and means carried by each of said shafts for coöperating with said units.

9. A speed changing and reversing gear comprising alined driving and driven shafts having clutch members, and a transversely-shiftable frame having connecting units for connecting said shafts in different forward-driving and reverse-driving relations, all of said units having clutch members to engage the driving and driven clutch members.

10. A power-transmitting mechanism comprising alined driving and driven shafts, a transverse guide, and a shaft-connecting unit slidingly mounted in said guide and means carried by each of said shafts for coöperating with said unit.

11. A power-transmitting mechanism comprising driving and driven shafts having members of a pair of clutches, a transversely-shiftable connecting unit having the complemental members of said pair, and means for simultaneously engaging and disengaging said clutches.

12. A power-transmitting mechanism comprising alined driving and driven shafts having longitudinally-slidable clutch members, a transversely-shiftable connecting unit having complemental clutch members, and means for simultaneously and oppositely shifting the driving and driven clutch members.

13. A power-transmitting mechanism comprising driving and driven shafts, transverse guides, and a connecting unit slidable on said guides and having a three-point suspension thereon and means carried by each of said shafts for coöperating with said unit.

14. A power-transmitting mechanism comprising driving and driven shafts, a frame having side members longitudinal with said shafts, a transverse guide structure having a three-point support on the frame members, and a connecting unit slidable on said guiding structure and means carried by each of said shafts for coöperating with said unit.

15. A power-transmitting mechanism comprising driving and driven members, a coupling carried by each of said members, a shiftable connecting unit, a hand-lever to shift said unit having an auxiliary handle, and means to shift said couplings having a pivotal connection at its free end with said auxiliary handle, the axis of said pivot being movable into and out of line with the axis of the hand-lever.

16. In a speed-changer, a driving member, a driven member, mechanism for transmitting the motion of the driving member, either at the same or at different rates of speed, to the driven member, a support independent of the driving member and on which said transmitting mechanism is mounted, and mechanism for causing the engagement of said driving member and driven member with said transmitting mechanism.

17. In a speed-changer, a driving member, a driven member, mechanism for transmitting the motion of the driving member, either at the same or at different rates of speed, to the driven member, a support independent of the driven member and on which said transmitting mechanism is mounted, and mechanism for causing the engagement of said driving member and driven member with said transmitting mechanism.

18. In a speed-changer, a driving member, a driven member, mechanism for transmitting the motion of the driving member, either at the same or at different rates of speed, to the driven member, a support independent of the driving and driven members and on which said transmitting mechanism is mounted, and mechanism for causing the engagement of said driving member and driven member with said transmitting mechanism.

19. In a speed-changer, a driving member, a driven member, a series of independent groups of gears for transmitting the motion of the driving member to the driven member, either at the same or at different rates of speed, a movable support independent of the driving and driven members and on which said groups of gears are mounted, means for moving said support to bring a group of gears into position for engagement with the driving and driven member, and mechanism for engaging the driving and driven members with the group of gears which has been brought into position for engagement.

20. In a speed-changer, a driving member, a driven member, a series of independent groups of gears for transmitting the motion of the driving member to the driven member, either at the same or at different rates of speed, a movable support, independent of the driving and driven members and on which said groups of gears are mounted, means for moving said support to bring a group of gears into alinement for direct engagement with the driving and driven member, and mechanism for engaging the driving and driven members with the group of gears which has been brought into position for engagement.

21. In a speed-changer, a driving member, a driven member, a series of independent groups of gears for transmitting the motion of the driving member to the driven member, either at the same or at different rates of speed, or to reverse said driven member, a movable support independent of the driving and driven members and on which said groups of gears are mounted, means for moving said support to bring a group of gears into position for engagement with the driving and driven member, and mechanism for engaging the driving and driven members with the group of gears which has been brought into position for engagement.

22. In a speed-changer, a driving member, a driven member, a series of independent groups of gears for transmitting the motion of the driving member to the driven member, either at the same or at different rates of speed, or to reverse said driven member, a movable support independent of the driving and driven members and on which said groups of gears are mounted, means for moving said support to bring a group of gears into alinement for direct engagement with the driving and driven members, and mechanism for engaging the driving and driven members with the group of gears which has been brought into position for engagement.

23. In a speed-changer, a driving member, a driven member, a series of independent groups of gears for transmitting the motion of the driving member to the driven member, either at the same or at different rates of speed, or to reverse said driven member at a lower rate of speed, a movable support independent of the driving and driven members and on which said groups of gears are mounted, means for moving said support to bring a group of gears into position for engagement with the driving and driven member, and mechanism for engaging the driving and driven members with the group of gears which has been brought into position for engagement.

24. In a speed-changer, a driving member, a driven member, a series of independent groups of gears for transmitting the motion of the driving member to the driven member, either at the same or at different rates of speed, or to reverse said driven member at a lower rate of speed, a movable support independent of driving and driven members and on which said groups of gears are mounted, means for moving said support to bring a group of gears into alinement for direct engagement with the driving and driven member, and mechanism for engaging the driving and driven members with the group of gears which has been brought into position for engagement.

25. In a speed-changer, a driving member, a driven member, mechanism for transmitting the motion of the driving member, either at the same or at different rates of speed, to the driven member, a support independent of the driving member and on which said transmitting mechanism is mounted, and clutch mechanism for causing the engagement of said driving member and driven member with said transmitting mechanism.

26. In a speed-changer, a driving member, a driven member, mechanism for transmitting the motion of the driving member either at the same or at different rates of speed, to the driven member, a support independent of the driven member and on which said transmitting mechanism is mounted, and clutch mechanism for causing the engagement of said driving member and driven member with said transmitting mechanism.

27. In a speed-changer, a driving member, a driven member, a series of independent groups of gears for transmitting the motion of the driving member to the driven member, either at the same or at different rates of speed, a movable support independent of the driving and driven members and on which said groups of gears are mounted, a lever for moving said support to bring a group of gears into position for engagement with the driving and driven member, and mechanism for engaging the driving and driven members with the group of gears which has been brought into position for engagement.

28. In a speed-changer, a driving member, a driven member, a series of independent groups of gears for transmitting the motion of the driving member to the driven members, either at the same or at different rates of speed, a movable support independent of the driving and driven members and on which said groups of gears are mounted, a lever for moving said support to bring a group of gears into alinement for direct engagement with the driving and driven members, and mechanism for engaging the driving and driven members with the group of gears which has been brought into position for engagement.

29. In a speed-changer, a driving member, a driven member, mechanism for transmitting the motion of the driving member, either at the same or at different rates of speed, to the driven member, a support independent of the driving and driven members and on which said transmitting mechanism is mounted, and clutch mechanism for causing the engagement of said driving member and driven member with said transmitting mechanism.

30. In a speed-changer, a driving member, a driven member, a series of independent groups of gears for transmitting the motion of the driving member to the driven member, either at the same or at different rates of speed, a movable support on which said groups of gears are mounted, means for moving said support to bring a group of gears into position for engagement with the driving and driven members, and mechanism for engaging the driving and driven members with the group of gears which has been brought into position for engagement.

31. In a speed-changer, a driving member, a driven member, a series of independent groups of gears for transmitting the motion of the driving member to the driven member, either at the same or at different rates of speed, a movable support on which said groups of gears are mounted, means for moving said support to bring a group of gears into position for engagement with the driving and driven members, and clutch mechanism for engaging the driving and driven members with the group of gears which has been brought into position for engagement.

32. In a speed-changer, a driving member, a driven member, a series of independent groups of gears for transmitting the motion of the driving member to the driven member, either at the same or at different rates of speed, a movable support on which said groups of gears are mounted, means for moving said support in a plane between the driving and driven members to bring a group of gears into position for engagement with the driving and driven members, and mechanism for engaging the driving and driven members with the group of gears which has been brought into position for engagement.

33. In a speed-changer, a driving member, a driven member, a series of independent groups of gears for transmitting the motion of the driving member to the driven member, either at the same or at different rates of speed, a movable support on which said groups of gears are mounted, means for moving said support in a plane between the driving and driven members to bring a group of gears into position for engagement with the driving and driven members, and clutch mechanism for engaging the driving and driven members with the group of gears which has been brought into position for engagement.

In testimony whereof I have affixed my signature in presence of two witnesses.

HERBERT H. BUFFUM.

Witnesses:
Wm. A. Rolfe,
R. M. Pierson.